United States Patent [19]

Kurosawa

[11] 4,394,697
[45] Jul. 19, 1983

[54] MAGNETIC RECORDING/REPRODUCING APPARATUS

[75] Inventor: Tsutomu Kurosawa, Ohmiya, Japan

[73] Assignee: Sahi Electronics Co., Ltd., Ohmiya, Japan

[21] Appl. No.: 177,736

[22] Filed: Aug. 13, 1980

[51] Int. Cl.³ ............... G11B 15/32; B65H 51/28; H04M 1/65

[52] U.S. Cl. .................... 360/91; 360/137; 242/180; 179/6.03

[58] Field of Search .............. 360/91, 92; 242/180; 179/6.01, 6.03

[56] References Cited

U.S. PATENT DOCUMENTS 3,604,624  9/1971  Miura et al. ............ 360/137
3,687,395  8/1972  Goshima et al. ........ 242/180
3,777,417 12/1973  MacNeill et al. ....... 360/91
4,118,602 10/1978  Jacobson ............... 360/137

Primary Examiner—Robert S. Tupper
Attorney, Agent, or Firm—Darby & Darby

[57] ABSTRACT

A magnetic record/reproduce apparatus comprising drive force transmitting means including levers that are actuated by one drive motor to drive a reproducing magnetic medium and a recording magnetic medium, and rotating means having cams that are driven by said transmitting means is disclosed. The drive force transmitting means for driving the reproducing magnetic medium is separate from that for driving the recording magnetic medium. Each drive force transmitting means is provided with a pin that engages a single cam member, the rotation of said cam member causes each lever to move, thereby achieving reproduction/rewinding of said reproducing magnetic medium and recording-/rewinding of said recording magnetic medium alternately.

9 Claims, 8 Drawing Figures

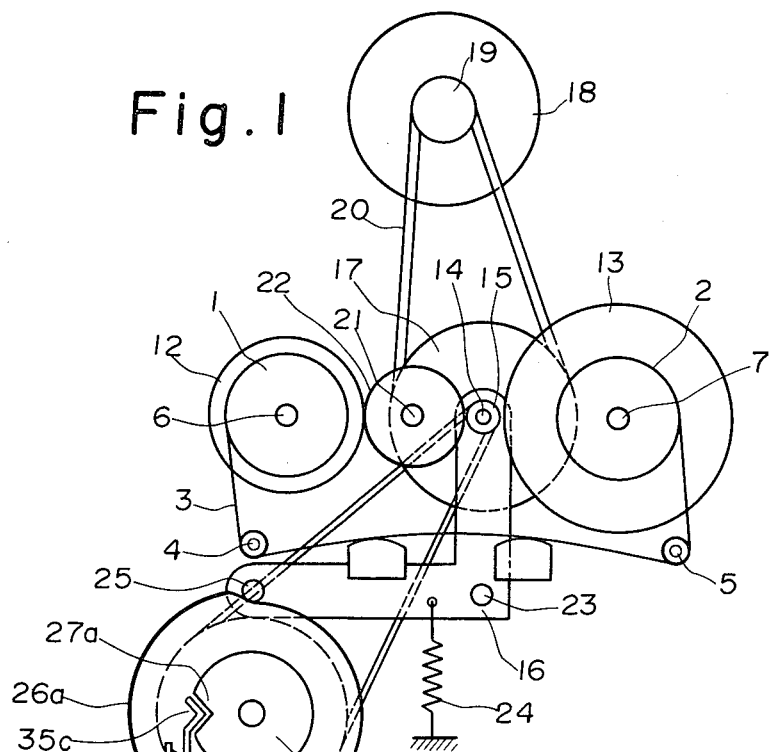
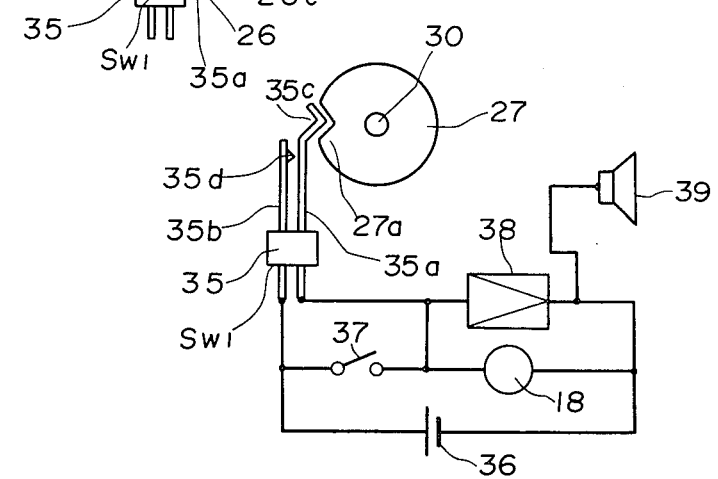

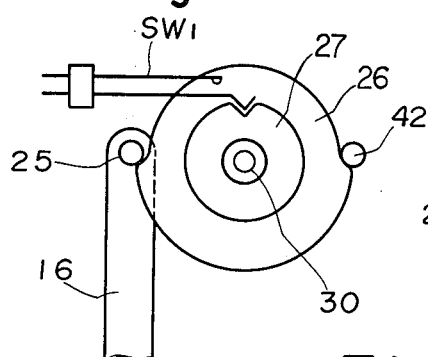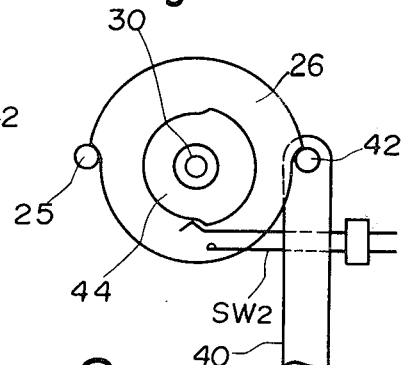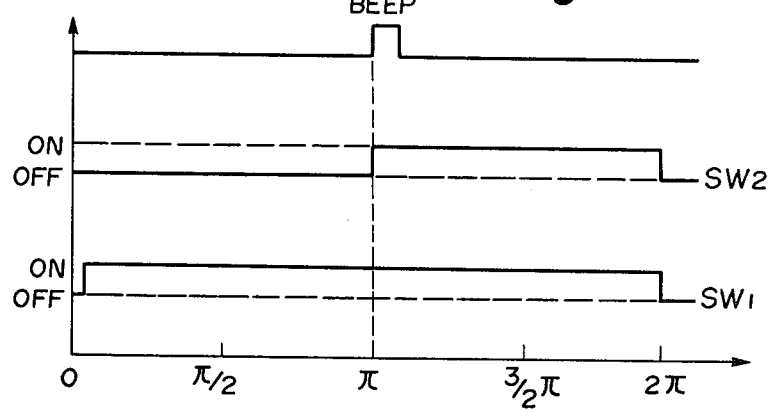

MAGNETIC RECORDING/REPRODUCING APPARATUS

BACKGROUND OF THE INVENTION

1. Field of the Invention

This invention relates to a magnetic recording/reproducing apparatus having a magnetic recording section and a magnetic reproducing section, and more particularly, to a magnetic recording/reproducing apparatus for automatic answering telephone set designed to be operated timely by one drive motor and one rotating means.

2. Description of the Prior Art

The conventional magnetic recording/reproducing apparatus for an announcement machine or automatic answering telephone set reproduces audio signals recorded in a cartridge of endless tape and records sounds from a tape running between two reels in a cassette or other suitable casing. However, a magnetic reproducing apparatus using a cartridge of endless type is expensive for three reasons: one is that the cartridge itself is expensive; another reason is that the apparatus requires a complicated drive mechanism to make the tape stop precisely at the starting or terminating position; and the third reason is that the apparatus must employ a complex mechanism for indicating tape transport time. The first two of these defects are eliminated in the case of a magnetic reproducing apparatus for an automatic answering telephone set using a reel-to-reel cassette, but it still requires a complicated and costly mechanism for displaying a correct tape transport time.

SUMMARY OF THE INVENTION

Therefore, the primary object of this invention is to provide magnetic recording/reproducing apparatus which uses only a simple construction to operate a reproducing magnetic medium and a recording magnetic medium.

The present invention is characterized in that a magnetic record/reproduce apparatus comprises drive force transmitting means including levers that are actuated by one drive motor to drive a reproducing magnetic medium and a recording magnetic medium and rotating means having a cam member that is driven by said drive force transmitting means, said levers being brought into engagement with the cam member of said rotating means to move said levers by the rotation of said cam member, thereby achieving reproduction/rewinding of said reproducing magnetic medium and recording/rewinding of said recording magnetic medium alternately.

BRIEF DESCRIPTION OF THE DRAWINGS

FIG. 1 is a plan view showing the magnetic reproducing section of the magnetic recording/reproducing apparatus of this invention;

FIG. 3 is a circuit diagram showing the operation of the magnetic recording/reproducing apparatus of this invention;

FIGS. 7A and 7B are each a plan view showing a cam used as rotating means in the magnetic recording/reproducing apparatus of this invention; and FIG. 8 is a time chart showing the movement of the cam of FIG. 7.

DESCRIPTION OF THE PREFERRED EMBODIMENT

Preferred embodiments of this invention are hereunder described in detail by reference to the accompanying drawings.

Figure 2:
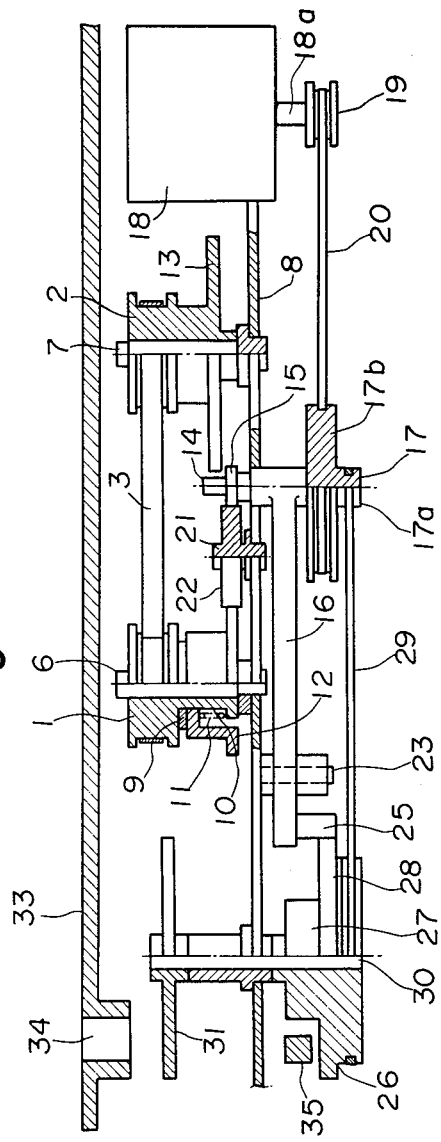
FIG. 2 is a transversal cross section of part of the magnetic reproducing section of FIG. 1.

In FIGS. 1 and 2, a magnetic medium 3 from a feed reel 1 is directed by guide rolls 4 and 5 to be accumulated by a take-up reel 2. One end of the magnetic medium 3 is fixed to the reel 1, and the other end is fixed to the reel 2. The reels 1 and 2 are rotatably mounted on vertical shafts 6 and 7 on a chassis 8. A clutch 10 is rotatably mounted on the underside of the feed reel 1 through a felt sheet 9 and it presses the underside of said reel by means of a spring 11. The underside of the clutch 10 is integral with a first driven wheel 12. These elements are so arranged that the rotational force of the first driven wheel 12 is transmitted to the clutch 10, felt sheet 9 and the feed reel 1 in that order in rewind mode of the magnetic medium 3 which will be described later.

Figure 4:
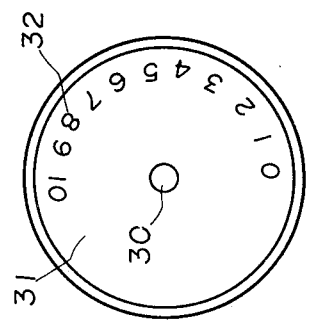
FIG. 4 is a plan view of a disc used in the magnetic recording/reproducing apparatus of this invention for displaying the magnetic medium transport time.

A second driven wheel 13 is mounted on the underside of the take-up reel 2 and it rotates about the shaft 7 of that reel as described hereunder, drive force transmitting means is provided between the feed reel 1 and take-up reel 2; the means has a main shaft 14 that can swing through an arc, a first drive wheel 15 rotatably mounted on said shaft 14, a pivotally mounted lever 16 which is generally L-shaped, and a stepped pulley 17 fixed to the shaft 14 and which has grooves 17a and 17b in each of which a belt runs. A belt 20 that runs in the groove 17b is provided to move between the pulley 17 and a pulley 19 to transmit the rotational force of the pulley 19. The pulley 19 is rotatably mounted on the shaft 18a of a drive motor 18. A second drive wheel 22 is rotatably mounted on a vertical shaft 21 on the chassis 8 between the first driven wheel 12 of the feed reel 1 and a first drive wheel 15. The first lever 16 is pivotally mounted on a point 23. A vertical pin 25 is provided on the end of the lever 16 the farthest from the main shaft 14 and the pin is in contact with a cam 26 which will be described later. The first drive wheel 15 is so designed that when it is at rest, it is biased by the spring 24 to press the second drive wheel 22 to contact feed reel 1. A belt 29 is provided to move between the pulley 17 fixed to the main shaft 14 and a rotating member consisting of a first cam 27, second cam 26 and a pulley 28. The belt runs in the groove 17a of the pulley 17 and transmits the driving force of the drive motor 18 to the rotating member. The rotating member is rotatably mounted on a shaft 30 that penetrates the chassis 8. A disc 31 that rotates in synchronism with said rotating member is fixed to the shaft 30. As shown in FIG. 4, the top surface of the disc 31 is provided with a series of numeric figures 32 that indicate how long the magnetic medium 3 has been in reproduction or record mode. The figures can be seen through a window 34 provided on the top of the casing 33 of the magnetic record/reproduce apparatus.

The first cam 27 has a V-shaped notch 27a in the edge. A first switch SW1 is provided that consists of a first contact member 35a with a V-shaped tip 35c disposed on a substrate 35 parallel to a second contact member 35b having a contact point 35d. When the tip 35c of the contact member 35a is in engagement with the notch 27a in the first cam 27, the first contact member 35a is apart from the second contact member 35b to make an open circuit.

The second cam 26 is formed integrally with the underside of the first cam 27 and is fixed to the shaft 30. The second cam 26 has first and second cam surfaces 26a and 26b having different diameters. It also has two other cam surfaces 26c, 26c that connect the first cam surface 26a to the second cam surface 26b. The rotating member is designed to rotate at a given speed (e.g. one revolution in 30 seconds). The second cam 26 is so adjusted that when it rotates a given quantity, the cam surface 27c contacts the pin 25 to make the cam stop. The first switch SW1 is connected to an amplifier circuit 38, a power source 36, a start switch 37, and the drive motor 18.

Figure 6:
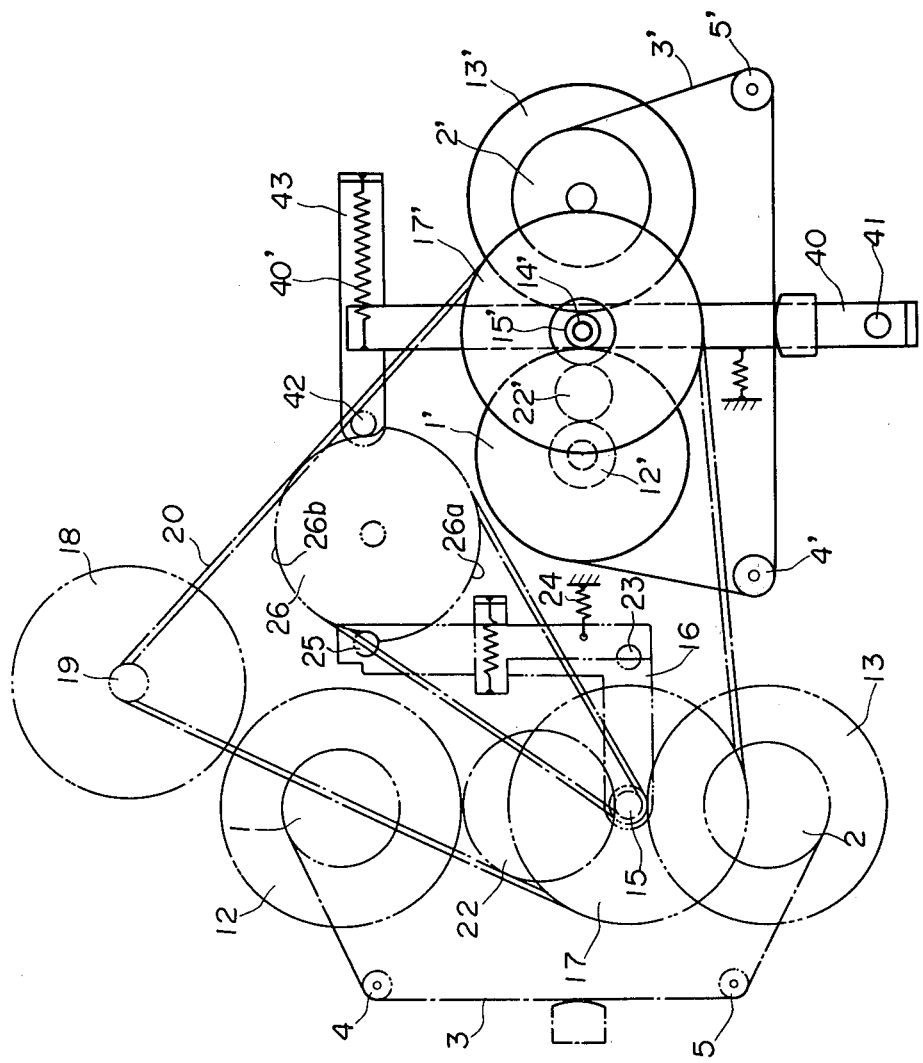
FIG. 6 is a plan view showing one embodiment of the magnetic recording/reproducing apparatus of this invention.

FIG. 6 shows the magnetic recording section of the magnetic record/reproduce apparatus of this invention. In the figure, the reproducing section of FIG. 1 is shown by a long and short dash line. The belt 20 from the pulley 19 on the drive motor 18 is provided to move between the stepped pulley 17 and a pulley 17' in the recording section. A mechanism is provided for driving a magnetic recording medium 3', and it is identical with the mechanism shown in FIGS. 1 and 2: it comprises a feed reel 1', a take-up reel 2', a first drive wheel 15', a second drive wheel 22', a first driven wheel 12', a second driven wheel 13', and guide rollers 4' and 5'.

The cam surface 26c of the second cam 26 of the rotating member is in contact with a vertical pin 42 on one end of the bar 40' of a T-shaped second lever 40. A spring 43 is provided on the other end of the bar 40' to allow the lever 40 to swing through an arc about a pivot 41. The first drive wheel 15' and stepped pulley 17' are arranged on the substantially central position of the second lever 40. A third cam 44 is rotatably mounted on the shaft 30 as shown in FIGS. 7A and 7B.

The magnetic record/reproduce apparatus of this invention having the construction described above is operated in the following manner. When a ringing turns the start switch 37 on, the circuit comprising the power source 36, start switch 37 and drive motor 18 is closed whereupon the motor starts to run. This forms a closed circuit of amplifier 38-power source 36-start switch 37. Then, the amplifier circuit 38 is on to enable signal reproduction from a speaker 39. When the start switch 37 is on, the drive motor 18 runs to transmit rotational force to the first cam 27 via the belt 20, pulley 17 and belt 29. The cam 27 rotates and the tip 35c of the first contact member 35a is disengaged from the notch 27a in the cam. Then, the contact point 35d of the second contact member 35d contacts the first contact member 35a to close the circuit. Once this state is obtained, the drive motor 18 continues to run even if the start switch 37 is turned off. The second cam 26 coaxial with the first cam 27 also rotates, and so, when the pin 25 on the lever 16 that has been in contact with the cam surface 26c of the second cam contacts the first cam surface 26a of the second cam, the lever 16 including the first drive wheel 15 that has been in contact with the second drive wheel 22 is turned clockwise as shown in FIG. 1 or counterclockwise as shown in FIG. 6 about the pivot 23 counteracting the spring 24, whereupon the main shaft 14 is brought into contact with the second driven wheel 13 for the take-up reel 2 to rotate said driven wheel counterclockwise. Then, the take-up reel 2 is in reproduction mode to make the recorded announcement. On the other hand, the pin 42 on the second lever 40 in the magnetic recording section is in contact with the second cam surface 26b, so the first drive wheel 15' in the recording section is in a neutral position and idles together with the pulley 17.

The pin 25 remains in contact with the first cam surface 26a of the second cam 26 until reproduction is completed by a given quantity of the magnetic medium 3 being accumulated by the take-up reel 2. When the pin 25 reaches the second cam surface 26b via the cam surface 26c, the lever 16 turns counterclockwise as shown in FIG. 1 or clockwise as shown in FIG. 6 about the pivot 23, and by the biasing force of the spring 24, the first drive wheel 15 causes the first driven wheel 12 to rotate via the second drive wheel 22. This way, the magnetic medium 3 is rewound at fast rate. Because of the larger diameter of the wheel 15 as compared to the shaft 14, the rewinding speed is faster than in reproduction mode. Since the starting (or terminating end) of the magnetic medium 3 is fixed to the reel 1 or 2, when the medium is rewound to the starting end, the feed reel 1 slips and idles because of the presence of the felt 9 between the clutch 10 and the reel 1.

At the same time, the vertical pin 42 on the second lever 40 contacts the first cam surface 26a of the second cam 26 to turn the second lever 40 clockwise about the pivot 41, whereupon the main shaft 14' contacts the second drive wheel 13' to rotate the take-up reel 2' in record mode. In this mode, as FIGS. 7 and 8 show, the third cam (44) has caused a switch SW2 to select record mode.

FIG. 8 is a time chart showing the timing of the switches SW1 and SW2. When the pin 42 reaches the cam surface 26c after the take-up reel 2' started to accumulate the magnetic medium 3', the second lever 40 turns counterclockwise about the pivot 41 and the tip 35c of the contact member 35a of switch SW1 drops in the notch 27a of the first cam 27 to open the circuit.

Figure 5:
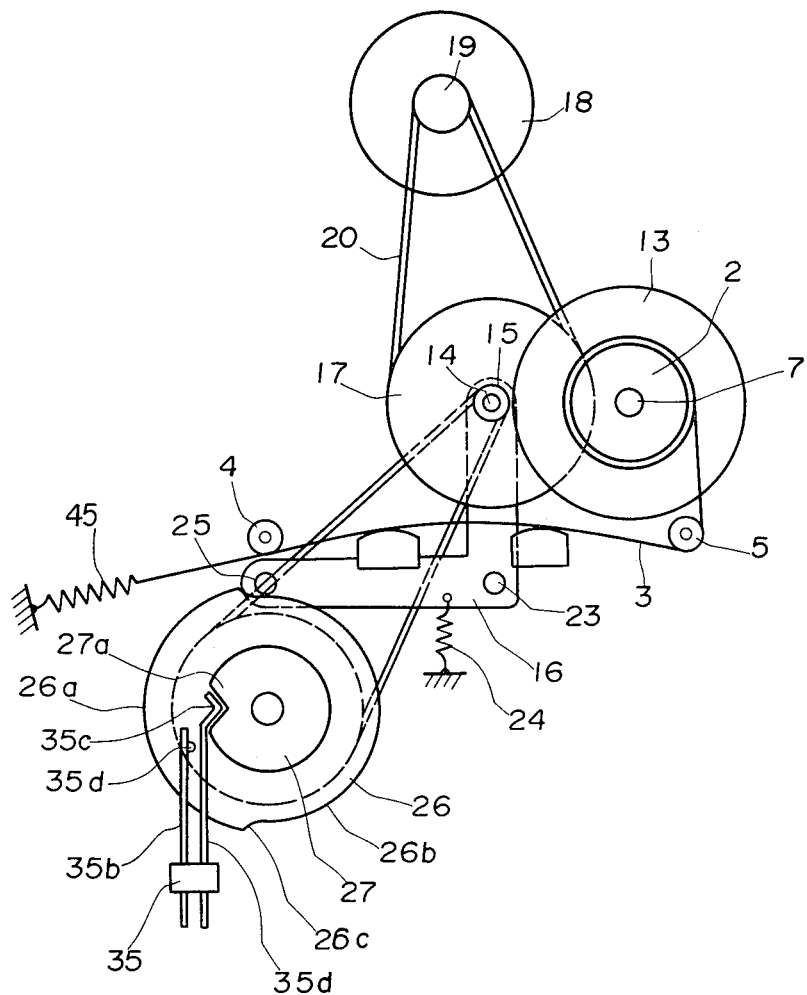
FIG. 5 is a plan view showing another embodiment of the magnetic reproducing section of this invention.

FIG. 5 shows another embodiment of the reproducing section, shown in FIG. 1, of the magnetic record/reproduce apparatus of this invention. Like numerals identify like components. The feed reel and second drive wheel are omitted from FIG. 5. The reproducing section of FIG. 5 is so designed that the tape 3 one end of which is fixed to the chassis through a spring 40 is rewound by the biasing force of the spring in rewind mode.

This invention has been described as if it were applied to the rim drive mechanism, but it should be understood that the invention can also be applied to the capstan drive mechanism.

Being constructed and operated as described in the foregoing, this invention uses a single drive motor and a single rotating means to achieve very simple switching between record and reproduction mode and to make accurate display of magnetic medium transport time.

What is claimed is:

1. Recording-reproducing apparatus for the automatic answering of telephones comprising:
   first and second independently movable, elongated, flexible recording media, one for storing a prerecorded message to be transmitted and the other for recording an incoming message, first supply and take-up means for the first of said media for effecting forward and rewind movements thereof, second supply and take-up means for the second of said media for effecting forward and rewind movements thereof, motive means, cam means driven by said motive means, first pivotable lever means formed with first follower means for following said cam means and with first pulley means driven by said motive means, second pivotable lever means formed with second follower means for following said cam means and with second pulley means driven by said motive means, said first lever means being pivoted in response to the movements of said first follower means in such a manner as selectively to bring said first pulley means into driving relation with at least said first take-up means and thereby control at least the forward movement of the first of said recording media, and said second lever means being pivoted in response to the movements of said second follower means in such a manner as selectively to bring said second pulley means into driving relation with at least said second take-up means and thereby control at least the forward movement of the second of said recording media.

2. Apparatus according to claim 1, wherein said first lever means is pivoted in response to the movements of said first follower means in such a manner as selectively to bring said first pulley means into driving relation with said first supply means and thereby control the rewind movement of the first of said recording media, and said second lever means is pivoted in response to the movements of said second follower means in such a manner as selectively to bring said second pulley means into driving relation with said second supply means and thereby control the rewind movement of the second of said recording media.

3. Apparatus according to claim 1, further comprising biasing means for automatically controlling the rewind movement of at least the first of said recording media upon termination of said driving relation of said first pulley means to said first take-up means.

4. Apparatus according to claim 1 wherein said first and second recording media are respectively first and second magnetic tapes.

5. Apparatus according to claim 1 wherein said first supply and take-up means comprises a first feed reel and a first take-up reel and said second supply and take-up means comprises a second feed reel and a second take-up reel.

6. Apparatus according to claim 1 wherein said first supply and take-up means comprises biasing means connected to the first of said recording media for controlling the rewind movement thereof and a first take-up reel and said second supply and take-up means comprises a second feed reel and a second take-up reel.

7. Apparatus according to claim 1 wherein said cam means comprises a cam wheel having a first cam face of a given configuration and a second cam face of a different configuration and wherein both of said follower means engage said cam faces, the arrangement being such that when one of said follower means engages one of said cam faces, the other of said follower means engages the other of said cam faces.

8. Apparatus according to claim 1 further comprising time indicating means mounted coaxially with said cam means and rotating therewith.

9. Apparatus according to claim 8 wherein said time indicating means comprises a disc with visible indicia thereon.

* * * * *

UNITED STATES PATENT AND TRADEMARK OFFICE
CERTIFICATE OF CORRECTION

PATENT NO. : 4,394,697
DATED : July 19, 1983
INVENTOR(S) : Tsutomu Kurosawa

It is certified that error appears in the above-identified patent and that said Letters Patent are hereby corrected as shown below:

On the cover sheet please correct the name of the Assignee [73] to read as follows:

Delete "Sahi Electronics Co., Ltd." and substitute therefor --Asahi Electronics Co., Ltd.--.

Signed and Sealed this

Twenty-first Day of August 1984

[SEAL]

*Attest:*

*Attesting Officer*

GERALD J. MOSSINGHOFF

*Commissioner of Patents and Trademarks*